April 17, 1962 — P. O. LOUDON — 3,029,790

PERIODIC FISH FEEDER

Filed Oct. 27, 1960

Percy O. Loudon
INVENTOR.

BY Ramsey and Kolisch
Attys.

United States Patent Office 3,029,790
Patented Apr. 17, 1962

3,029,790
PERIODIC FISH FEEDER
Percy O. Loudon, 10113 Highway 99, Vancouver, Wash.
Filed Oct. 27, 1960, Ser. No. 65,435
8 Claims. (Cl. 119—51.11)

My invention is particularly adapted to feed fish, such as trout, in elongated rearing trays or ponds.

It has been my observation that when food is broadcast onto said trays or ponds that the larger, stronger fish gorge themselves and the younger and less vigorous fish are underfed. Thus, they do not grow uniformly even though at the start of a feeding program they might be of approximately the same age and vitality. Young trout fry and fingerlings will eat only the food that rests upon the surface of the water supported by the surface tension thereof. Thus, if large quanties of food are broadcast over the surface of a pond or tray, most of it will sink before it is eaten and only a minor portion will be eaten by the fish therein. It is necessary that the food be discharged onto the surface of the water of the pond at frequent intervals and in small amounts. If food is discharged from a known or predictable source, it is my observation that the fish will move to such source or will anticipate a change of feeding location or will observe an attendant as he moves along with a supply of food to be strewn over the surface of the tank or pond.

One of the principal objects of my invention is to provide an automatic dispenser of fish food particles that will supply said food particles over the entire length of the rearing pond or tray simultaneously and in such amounts as will be held suspended by the surface tension of the water until said quantities of food may be consumed by the fish in said tank.

A further object of my invention is to provide a fish food dispensing mechanism of this character which may be easily and quickly adjusted to supply only an adequate amount of food for each time interval and thus, all of the food dispensed will be eaten by the fish with minimum loss or spoilage of food.

A further object of my invention is to provide a food dispensing apparatus of this character which may discharge predetermined, but variable, quantities of food at selected intervals by an automatic means, thus to eliminate the human factor and to insure that sufficient food will be present for all of the fish to consume because it is wide spread so that all fish in said rearing pond or tank will have it available for them.

Further and other details of my invention are hereinafter described with reference to the accompanying drawing, in which.

Figure 1:
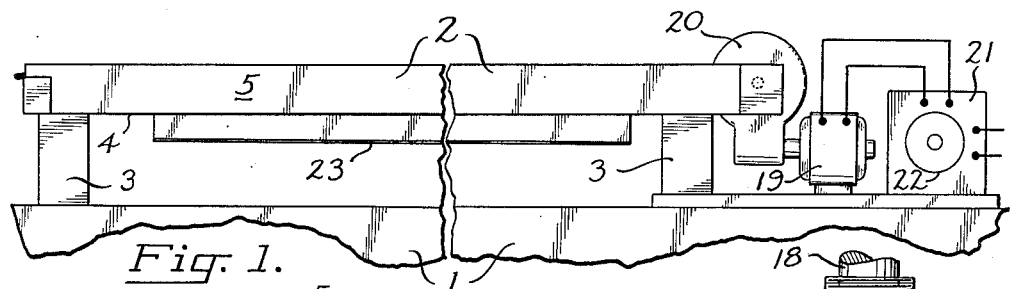
FIG. 1 is a foreshortened view of a rearing tray with an overlying feed trough extending longitudinally thereof, and substantially over the entire length thereof, and provided with selective power means for regulating the rate of discharge of food from said trough.

A periodic fish feeder embodying my invention is adapted to be used in superimposed relation with respect to an elongated rearing tray or pond 1. Said ponds and trays are usually from 15 to 20 feet long and 3 or 4 feet wide. A feeding tray 2 is carried by supports 3 arranged at the ends thereof and if the tray is unusually long it is common to provide a central support under the middle thereof, rather than to increase the strength of the tray to inhibit flexure. The feeding troughs are substantially as long as the rearing tray or pond with which they are adapted to be used and are provided with a floor 4 and side walls 5. One end 6 is closed by an imperforate member and the other end has associated therewith, feeding mechanism 7. Apertures 8 are arranged in spaced intervals in the floor of the tray and, depending upon the size of food particles to be discharged therethrough, are approximately a quarter inch in diameter.

Figure 2:
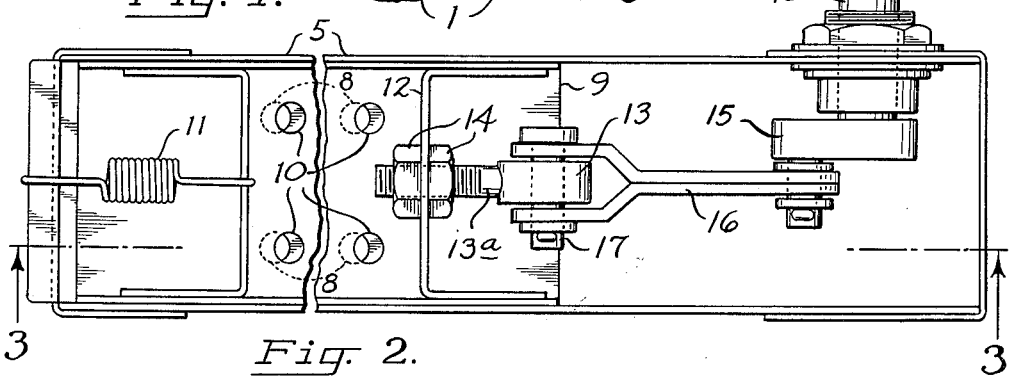
FIG. 2 is a foreshortened plan view of the trough portion of my food dispensing mechanism.

Reciprocally mounted in said trough and resting upon the floor thereof is a perforate slide having apertures 10 therein that are of a corresponding size and spacing to the apertures in the floor of the tray. A coiled spring 11 is arranged at the end 6 engaging an upstanding wall of the slide 9 in said end 6 and tends to pull the slide towards the left, as viewed in FIGS. 2 and 3. At the other end of the slide is a web 12, to which is secured a threaded eye 13 or other terminal fitting, having a threaded shank 13a and lock nuts 14 lying at each side of the web. The shank 13a has sufficient thread length to permit the degree of registration of the apertures of 8 and 10, respectively, to be adjusted to the throw of crank 15, which moves said slide, to cause the apertures to come into and out of registration.

In the drawings the apertures are indicated as being elliptical at approximately one-third of their diameters. If greater registration is desired the lug nuts are backed off and rotated until they lie more closely adjacent the end of the shank and the web between the two lug nuts is thus moved over correspondingly. This will cause the entire perforate slide to move relatively to the trough, thus, when the slide is moved towards the left at each stroke of the crank, a greater quantity of fish food will be discharged through said registering apertures.

Crank 15 is joined to the threaded eye by means of a pitman 16, which preferably is bifurcated to straddle the eye and be joined with the latter by a pin 17. The other end of the pitman is joined to the offset crank 15 which is carried by a power shaft 18 rotated by motor 19. If an electric motor is used it is common to utilize a speed reducer 20, of usual characteristics, so that multiple turns of the rotor of the motor will produce but one crank throw to cause the slide to move into and out of registration, on each cycle. The crank normally stops at substantially 3 o'clock and rotates one revolution and then stops. When the crank is at 9 o'clock, the apertures are in maximum registration and for a given setting food is discharged through the apertures in the floor of the feeding trough. A timer 21 is provided with a circular dial 22 thereon, so that the motor 19 is actuated for a predetermined period of time and at predetermined intervals. The length of time of actuation and the interval timing may be adjusted by use of the dial in the usual manner in which timers are utilized.

Figure 3:
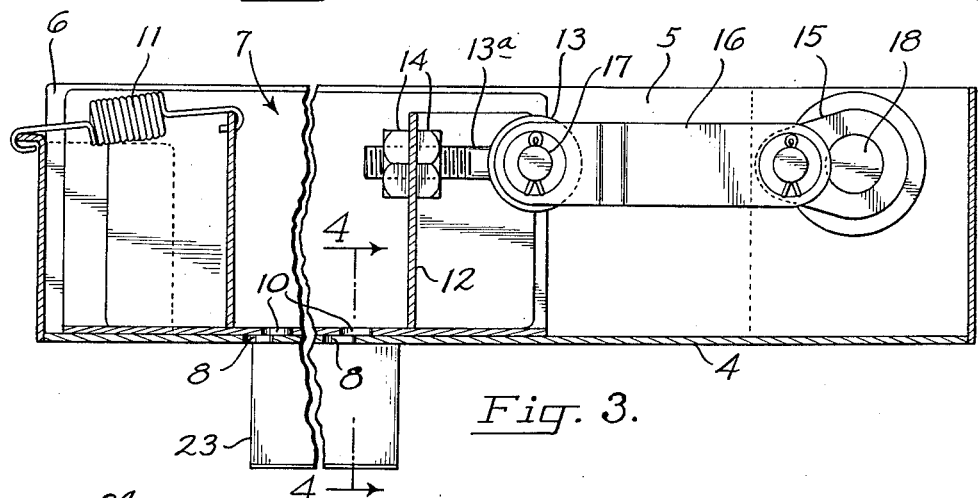
FIG. 3 is a foreshortened sectional view taken substantially on the line 3—3 in FIG. 2.
Figure 4:
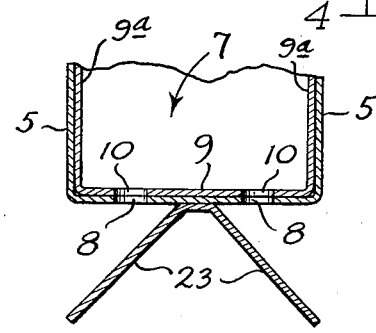
FIG. 4 is a fragmentary sectional view taken on the line 4—4 in FIG. 3 of the drawing.

The feed troughs may be filled periodically by an attendant or by an automatic supplying mechanism (not shown). If, for example, it is desired to utilize only one-half of the effective apertures, the nuts 14 are backed off and the threaded eye is adjusted with respect to the web so as to produce registration of one-half of the effective cross section of the apertures. If it is desired that the fish held within the rearing trays or ponds are to be supplied with food at 15 minute intervals, the dial of the timer is thus adjusted and each 15 minutes the motor 19 is actuated to cause the crank throw to rotate 360°, which will move the apertures 8 and 10 into registration and out of registration. The coiled spring 11 is inclined slightly from horizontal, as is indicated in FIG. 3, and exerts a downward pull upon the end of the slide with which it is associated so as to prevent foodstuff from working between the under face of the perforate slide 9 and the upper face of the apertured floor 4 of the feeding trough.

Only sufficient food is discharged at a time so that all of the fish in the rearing tray or pond will be fed before the food becomes wetted and breaks through the surface tension of the water on the top of the tray or pond and falls to the bottom.

It is not essential that power mechanism be used for actuating the feeding mechanism. This can be done by an attendant who is thus required to actuate the feeding mechanism once each time interval.

Water temperatures and the degree of light are determining factors in the feeding habits of fish. It is thus desirable that the quantities of food to be discharged each interval be easily regulated. The degree of light between day and night may be minimized by providing artificial lighting and if the variant in their feeding habit is only temperaturewise the number of changes in discharge volume are made less frequently.

Under present conditions from egg incubation to growth of fish to approximately 7 inches in length will take about one year with rainbow trout. By feeding them with a feeder embodying my invention, whereby all of the fish in the rearing pond or tray have equal access to the food which is provided in small amounts and rests upon the surface of the water, growth may be regulated and is more uniform because all of the fish will be fed. The fish also grow stronger and heavier and become more active. In practice, rearing trays are utilized under cover and rearing ponds are outside and uncovered. My periodic feed dispenser seems to be equally adaptable to both types of fish rearing media. Commonly, the smaller fish are reared under cover because temperatures may be controlled more readily and the fish are released into rearing ponds when they are large enough to withstand the temperature changes.

It has been my experience that the fish during the second year of their life frequently attain a length of from 7 to 10 inches and thus may be released into streams by state authorities so that they will be fish that may be kept by fishermen. Experience has determined that there is a high mortality of fingerlings when they have to compete under normal feeding conditions with native trout. Thus, when fish are released 9 or 10 inches long, they are sufficiently large to fend for themselves in competition with native trout. The use of a fish feeding device embodying my invention permits a 9 inch fish to be reared in trays and ponds at an expense of about $1.50 per fish which cost permits the release of game fish into the streams of the state to provide good catches for fishermen.

If it is determined that the amount of food discharged from the registering apertures 8 and 10 falls over too small an area, I have found that the size of the area may be increased without affecting the effectiveness of the device, by providing a shed or guide sheet 23 between two laterally spaced apertures in the floor of the feeding trough so that the food flowing down through the apertures will be directed laterally, due to the angle of inclination of the shed or guide.

When a feeding device is used under cover, it is not necessary to make the feeding trough moisture proof but with rearing ponds it is common to put a roof of sufficient breadth to prevent rain from dripping into the trough which would tend to cause the feed to cake and to be wasted. This is particularly true if the food is dry and comminuted, and the usual practice is followed of putting a 24 hour supply of food in the trough once each day.

The lengths and widths of the rearing trays or ponds is given by way of example and not by way of limitation. It is essential, however, that the feeding trough extend substantially the entire length of the rearing pond or tray so that the feeding area will be quite extended and thus, all fish within a tray or pond will have equal access to a portion of the food discharged from the feeding trough.

I claim:

1. An automatic dispenser of fish-food particles comprising an elongated fish rearing tank and an elongated fish feeding trough overlying said tank, extending longitudinally thereof and coinciding substantially with the length thereof, said trough comprising a plurality of discharge outlets spaced along said trough and communicating with the interior of the latter, food control means associated with said trough for opening and closing all of said discharge outlets synchronously, and means for varying the size of the effective discharge outlets, to vary the quantity of food discharged.

2. An automatic dispenser of fish-food particles comprising an elongated fish rearing tank and an elongated fish feeding trough overlying said tank, extending longitudinally thereof and coinciding substantially with the length thereof, said trough comprising a plurality of discharge outlets spaced along said trough and communicating with the interior of the latter, food control means associated with said trough for opening and closing all of said discharge outlets synchronously, means for varying the size of the effective discharge outlets, to vary the quantity of food discharged, and power means for actuating the food control means.

3. An automatic dispenser of fish-food particles comprising an elongated fish rearing tank and an elongated fish feeding trough overlying said tank, extending longitudinally thereof and coinciding substantially with the length thereof, said trough comprising a plurality of discharge outlets spaced at regular intervals along said trough and communicating with the interior of the latter, food control means associated with said trough for opening and closing all of said discharge outlets synchronously, and a unitary means for varying the size of the effective discharge outlets, to vary the quantity of food discharged from each of said outlets.

4. An automatic dispenser of fish-food particles comprising an elongated fish rearing tank and an elongated fish feeding trough overlying said tank, extending longitudinally thereof and coinciding substantially with the length thereof, said trough comprising a plurality of discharge outlets spaced along said trough and communicating with the interior of the latter, reciprocal food control means associated with said trough for opening and closing all of said discharge outlets synchronously, and means for varying the size of the effective discharge outlets, to vary the quantity of food discharged.

5. An automatic dispenser of fish-food particles comprising an elongated fish rearing tank and an elongated fish feeding trough overlying said tank, extending longitudinally thereof and coinciding substantially with the length thereof, said trough comprising a plurality of discharge outlets spaced along said trough and communicating with the interior of the latter, food control means associated with said trough for opening and closing all of said discharge outlets synchronously, means for varying the size of the effective discharge outlets, to vary the quantity of food discharged, and power means, including a timer, for actuating the food control means at selected intervals.

6. An automatic dispenser of fish-food particles comprising an elongated fish rearing tank and an elongated fish feeding trough overlying said tank, extending longitudinally thereof and coinciding substantially with the length thereof, said trough comprising a plurality of discharge outlets spaced along said trough and communicating with the interior of the latter, food control means associated with said trough for opening and closing all of said discharge outlets synchronously, means for varying the size of the effective discharge outlets, to vary the quantity of food discharged, and means for scattering the food laterally from said discharge outlets.

7. An automatic dispenser of fish-food particles comprising an elongated fish rearing tank and an elongated fish feeding trough overlying said tank, extending longitudinally thereof and coinciding substantially with the length thereof, said trough comprising a plurality of discharge outlets spaced along said trough and communicating with the interior of the latter, food control means associated with said trough for opening and closing all of said discharge outlets synchronously, means for varying the size of the effective discharge outlets, to vary the quantity of food discharged and, a sloping shield for scattering the food laterally from said discharge outlets.

8. An automatic dispenser of fish-food particles comprising an elongated fish rearing tank and an elongated fish feeding trough overlying said tank, extending longitudinally thereof and coinciding substantially with the length thereof, said trough comprising a plurality of discharge outlets spaced at regular intervals along said trough and communicating with the interior of the latter, reciprocal food control means associated with said trough for opening and closing all of said discharge outlets synchronously, a unitary means for varying the size of the effective discharge outlets, to vary the quantity of food discharged from each of said outlets, and power means including a timer for actuating the food control means at selected intervals.

References Cited in the file of this patent
UNITED STATES PATENTS

| | | |
|---|---|---|
| 2,482,675 | Lamb | Sept. 20, 1949 |
| 2,538,413 | Chard | Jan. 16, 1951 |
| 2,772,659 | Tennis | Dec. 4, 1956 |
| 2,865,447 | Kaufman | Dec. 23, 1958 |